W. H. PRINZ.
MALT HOUSE.
APPLICATION FILED JUNE 11, 1906.
967,973.
Patented Aug. 23, 1910.
5 SHEETS—SHEET 4.
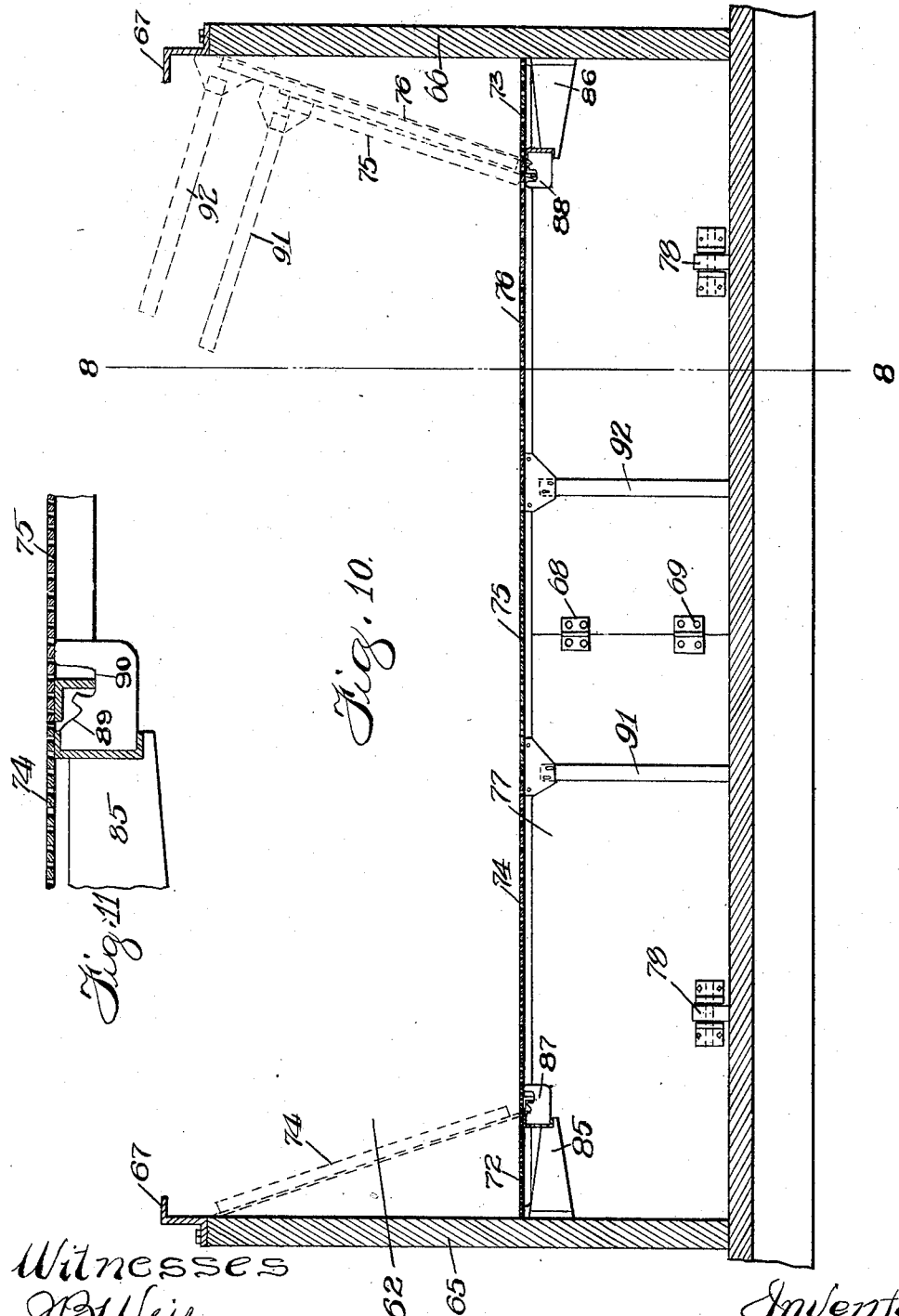
Witnesses
JBWeir
Jno H Nelson
Inventor
William H Prinz
by Bond Adams Pickard Jackson
his Atty.

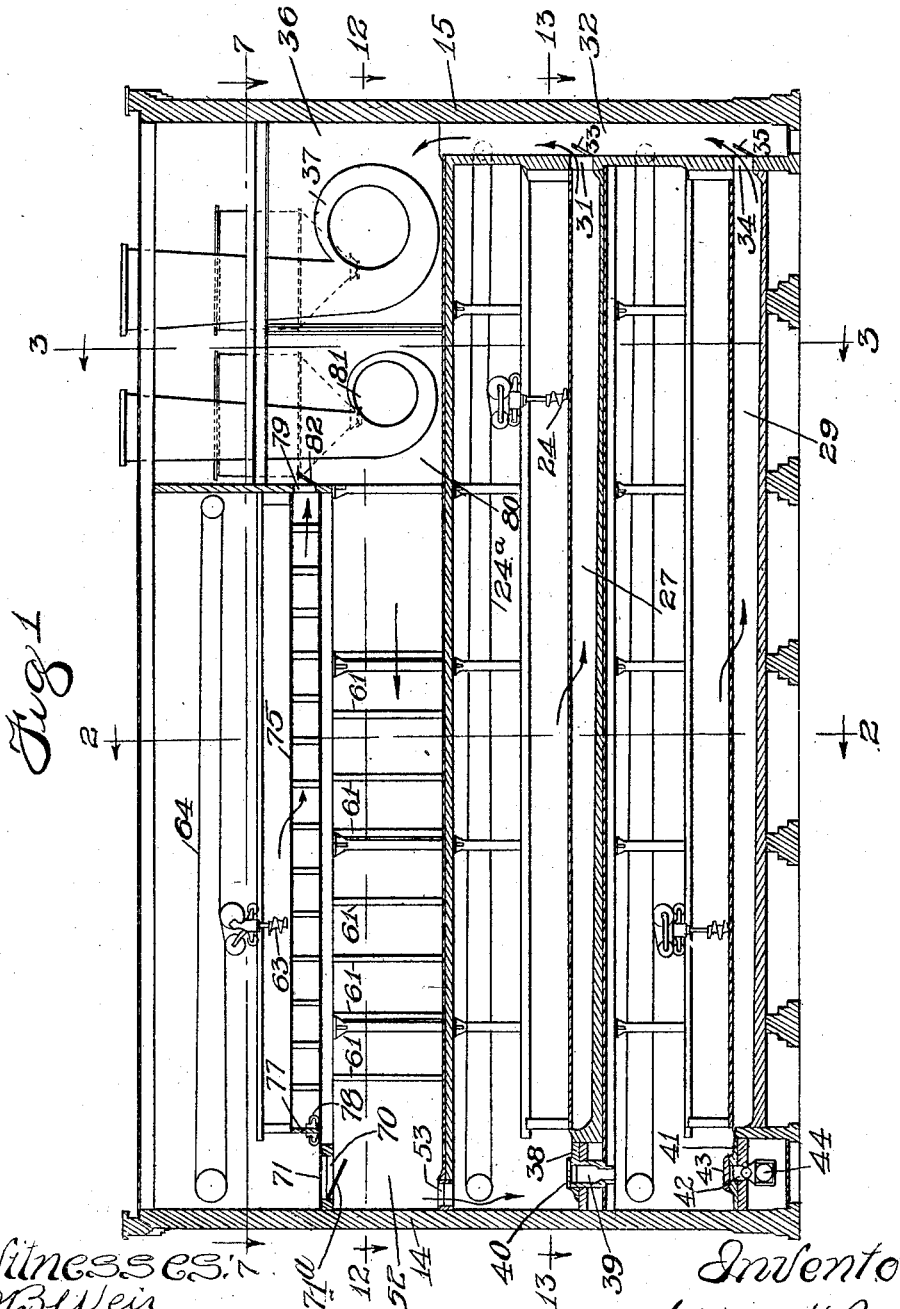

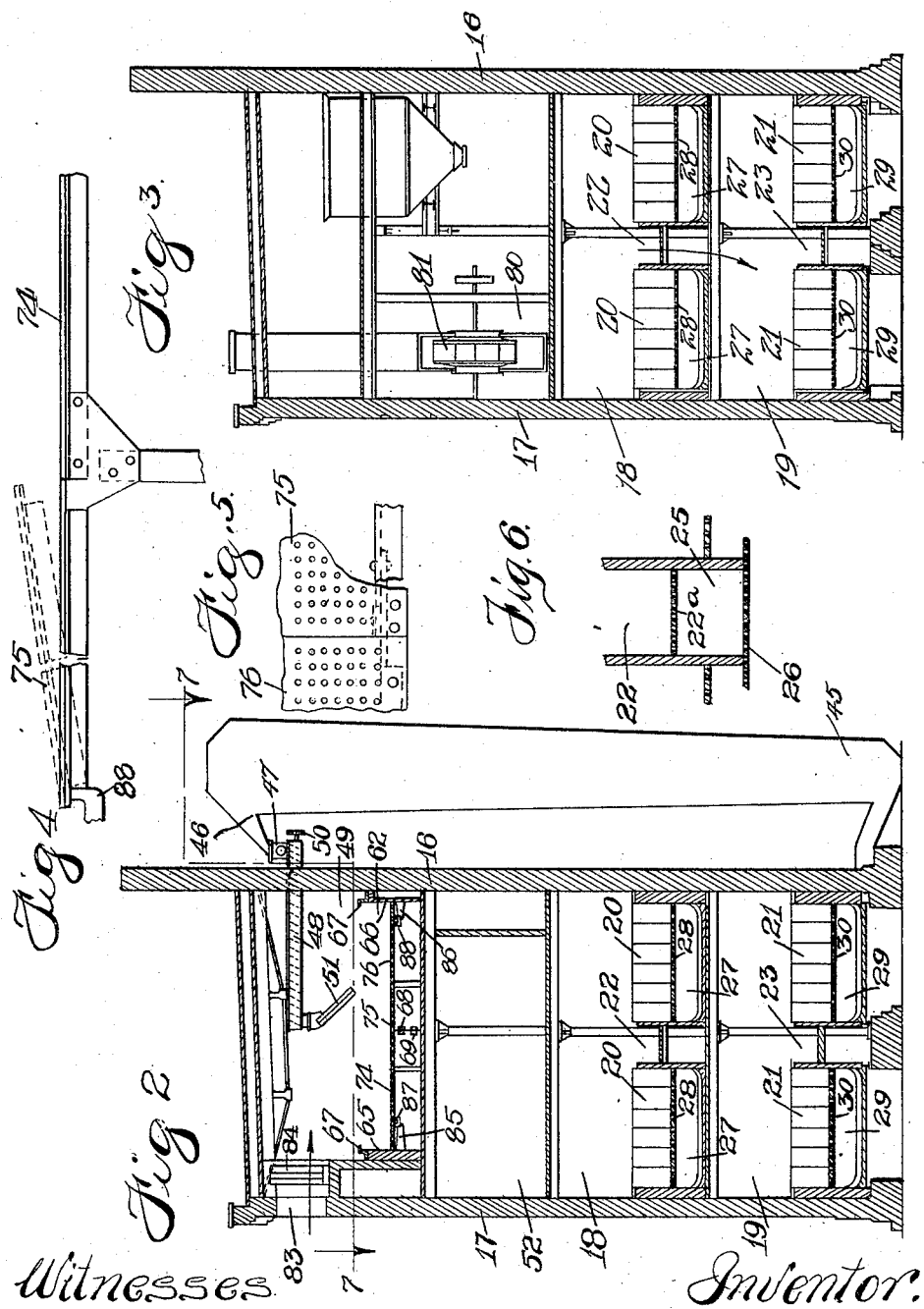

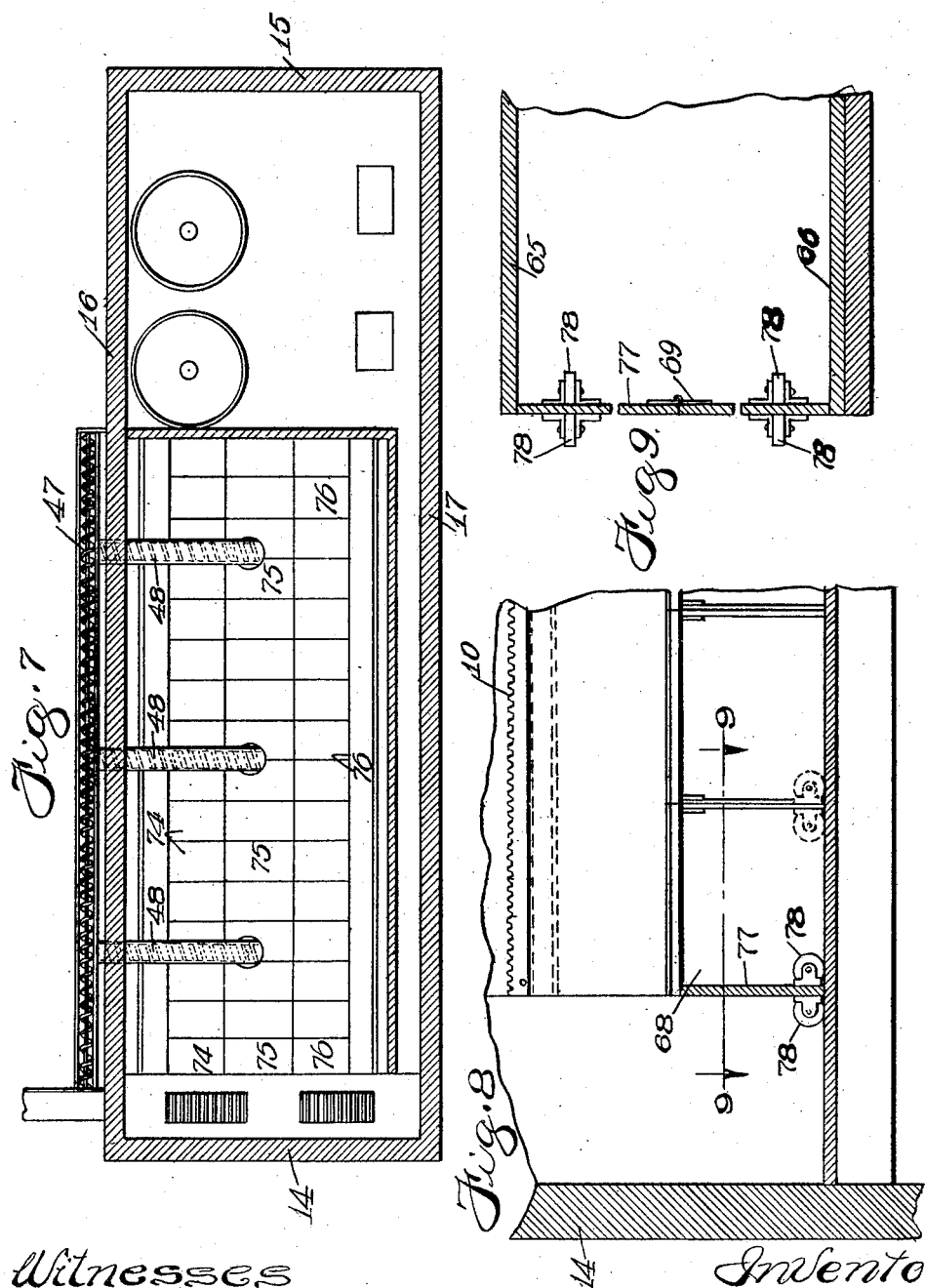

W. H. PRINZ.
MALT HOUSE.
APPLICATION FILED JUNE 11, 1906.
967,973.
Patented Aug. 23, 1910.
5 SHEETS—SHEET 5.
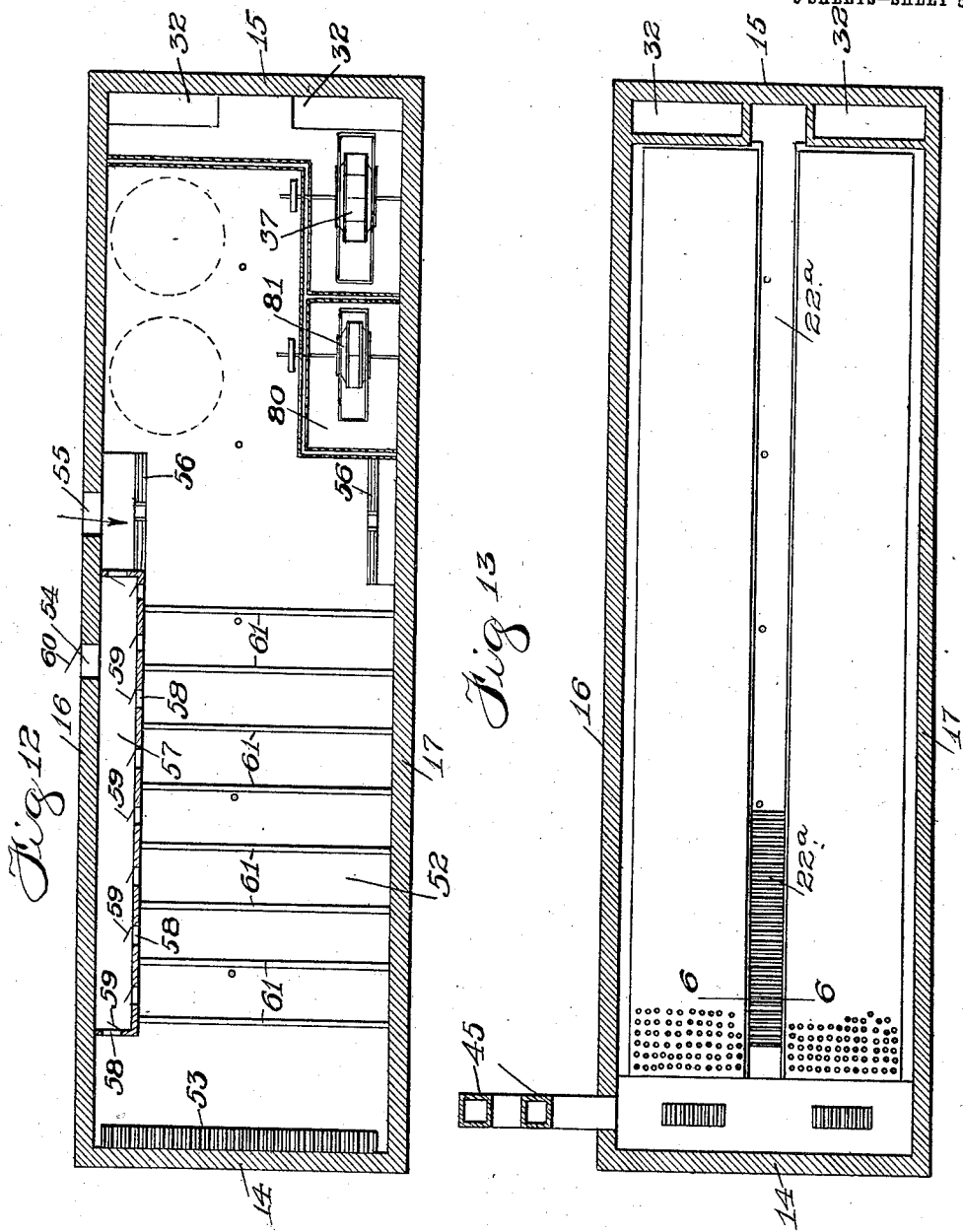

UNITED STATES PATENT OFFICE.

WILLIAM H. PRINZ, OF OAK PARK, ILLINOIS, ASSIGNOR TO SALADIN PNEUMATIC MALTING CONSTRUCTION COMPANY, OF CHICAGO, ILLINOIS, A CORPORATION OF ILLINOIS.

MALT-HOUSE.

967,973.

Specification of Letters Patent. Patented Aug. 23, 1910.

Application filed June 11, 1906. Serial No. 321,292.

*To all whom it may concern:*

Be it known that I, WILLIAM H. PRINZ, a citizen of the United States, residing at Oak Park, in the county of Cook and State of Illinois, have invented certain new and useful Improvements in Malt-Houses, of which the following is a specification, reference being had to the accompanying drawings.

My invention relates to the treatment of grain for the production of malt, and has for its object to provide improved apparatus by which the green malt may be kept in a perfectly fresh condition, and by which any desired amount can be removed from the mass of malt without interrupting the ventilating operation.

In order to get the greatest proportional amount of diastase, what is known as green malt should be used instead of dry malt; but heretofore it has been found to be practically impossible to keep the green malt in perfect condition in view of the fact that only a small amount is used at a time, and the apparatus heretofore employed has not been such as to provide for keeping the balance of the malt fresh until used up.

My improved apparatus makes provision for malting the barley, or other grain, and for keeping the green malt fresh while any desired quantity thereof may be removed from the mass without interrupting the malting operation. To this end I provide a withering kiln in which the malt is placed after germination has progressed sufficiently,—said kiln being arranged so that the malt may be properly ventilated by the passage through it of fresh air at any desired temperature, and being provided with suitable means for regulating the temperature and degree of moisture of the air used for ventilating the malt. By reducing the moisture of the air to a point below that required for further growth the malt may be kept perfectly fresh and green and its diastatic power retained at the maximum point. I can thus keep the malt in a perfect condition in summer or winter without regard to the out-door temperature, thereby securing the greatest returns from the grain treated.

In the accompanying drawings, which illustrate one embodiment of my invention, Figure 1 is a longitudinal vertical section of a building illustrating my invention, which building I shall hereinafter call the "malt house" as a convenient term of reference; Fig. 2 is a vertical cross section on line 2—2 of Fig. 1; Fig. 3 is a similar view on line 3—3 of Fig. 1; Fig. 4 is a detail, being a partial side view of the floor of the kiln; Fig. 5 is a partial plan view of the parts shown in Fig. 4; Fig. 6 is a cross sectional view on line 6—6 of Fig. 13, illustrating the arrangement for admitting air to the lower germinating compartments; Fig. 7 is a section on line 7—7 of Figs. 1 and 2; Fig. 8 is a partial vertical section on line 8—8 of Fig. 10; Fig. 9 is a horizontal section on line 9—9 of Fig. 8; Fig. 10 is a cross section of the upper or kiln floor of the malt house on line 10—10 of Fig. 8; Fig. 11 is an enlarged detail of certain parts shown in Fig. 10; Fig. 12 is a sectional view at the attemperator floor, being taken on line 12—12 of Fig. 1; and Fig. 13 is a sectional view at the upper germinating floor, being taken on line 13—13 of Fig. 1.

Referring to the drawings,—14—15 indicate the end walls, and 16—17 the side walls of the building, which may, however, be of any suitable shape. As best shown in Figs. 1, 2 and 3, the lower portion of the building is occupied by the germinating compartments. In the drawings I have illustrated the two lower floors as being devoted to the germination of the grain,—18 being an upper germinating room and 19 the lower germinating room. In each of said germinating rooms, as illustrated, there are two germinating compartments 20—21, gangways 22—23 being provided, respectively, between each pair of compartments. It will be understood that the compartments are oblong and are provided with suitable agitating mechanism, preferably rotary helices 24 driven by rope-drive mechanism 24ᵃ, as is well understood, said helices being arranged to travel longitudinally of the compartments and agitate the grain therein. Any desired number of compartments may, of course, be provided, and they may all be arranged on the same floor or on various floors as local conditions may make desirable.

22ᵃ indicates the floor of the gangway 22, which, as shown in Figs. 6 and 13, is partly perforated so that air may pass through it into the channel or duct 25 beneath it.

26 indicates the floor of the duct or channel 25, which is also perforated to permit air to pass below it, so that air from the upper germinating chamber 18 may pass through the floors 22ª—26 to the lower germinating chamber.

27 indicates ducts or channels beneath the compartments 20; and 28 indicates the perforated floors of the compartments 20.

29 indicates ducts or channels below the compartments 21, which compartments are also provided with perforated floors 30.

As best shown in Fig. 1, the channels or ducts 27 communicate through openings 31 at their ends with an upright duct or flue 32 at the end of the building. Valves 33 are provided for regulating the area of the openings 31 or for closing them entirely, as may be necessary. 34 indicates similar openings for the ducts 29 provided with valves 35. Said openings 34 also communicate with the flues 32.

From an inspection of Figs. 1, 2 and 13, it will be seen that the flues 32 are arranged side by side at the end of the building. By this construction fresh air from the upper germinating room may pass down through the perforated portion of the floor 22ª of the gangway 22 and of the floor 26 to the lower germinating room. The fresh air in both of said germinating rooms passes down through the grain in the compartments therein and thence through ducts 27—29 to the flues 32. The air is then foul and rises through said flues to an exhaust air chamber 36 provided with an exhaust fan 37, or other suitable mechanism for discharging the foul air from the building. The fan may be operated from any suitable source of power.

38 indicates a gangway at the opposite ends of the germinating compartments from the flue 32, in the floor of which are provided openings 39 through which malt may be dropped from the upper germinating room into the lower germinating room. Said openings are provided with covers 40 by which they may be closed. Similarly, 41 indicates a gangway at the corresponding end of the compartments in the lower germinating room, which is also provided with openings 42 having covers 43. The latter openings lie above and connect with a conveyer 44 which extends transversely of the building adjacent to the ends of the malting compartments and connects with an elevator 45 outside the building, as shown in Fig. 2. Said elevator may be of the endless chain and bucket type and discharges through a chute 46 into a conveyer 47 extending longitudinally of the upper portion of the building, as best shown in Figs. 2 and 7. The conveyer 47 delivers into conveyers 48 which extend into a kiln chamber 49 at the upper portion of the building, as shown in Figs. 2 and 7. The conveyers 47 and 48 are preferably of the ordinary helix type and are driven from any suitable source of power, as by sprocket wheels 50 shown in Fig. 2.

The conveyers 48 terminate at about the transverse center of the kiln chamber and are there provided with adjustable spouts 51 through which the grain may be distributed as desired.

The kiln chamber, which for convenience will be termed the "kiln," occupies the fourth floor of the building, the third floor 52 being the attemperator floor and being equipped with means for regulating the temperature of the air supplied to the grain in the germinating compartments. As best shown in Fig. 1, the attemperator floor communicates through openings 53 with the upper germinating room, and, as best shown in Fig. 12, it receives air from inlet openings 54—55 in the side of the building. The openings 55 communicate directly with the attemperator room 52, heaters 56 being provided by which the air may be heated if too cold. The opening 54 discharges into a compartment 57 at one side of the attemperator room. Said chamber communicates with the attemperator room through a series of openings 58 having valves or shutters 59, by which the supply of air entering the attemperator room from said chamber 57 may be regulated. A valve 60 is also provided at the opening 54 for regulating the admission of air to the chamber 57.

61 indicates attemperators which may be of any suitable construction and preferably extend transversely of the attemperator floor so that the air passing through the attemperator room may be cooled and mixed as may be necessary.

The kiln 49 is in some respects similar to the germinating room, being provided with a compartment 62 in which the grain may be placed and turned by means of agitators 63 similar to the agitators 24 and operated by a rope-drive 64 in the same way. The compartment 62 is, however, different in construction in that it is provided with means by which a greater or less portion of the grain may be removed from time to time without interfering with the operation of ventilating the grain. It may be well to state here that while this feature is herein illustrated and described as applied to the kiln it may also be applied to malting compartments or in any other situation where it may be desired to use it.

The construction of the kiln compartment is best shown in Figs. 8 to 11, inclusive. As best shown in Fig. 10, 65—66 indicate the side walls of the kiln compartment 62, which carry the usual rails 67 on which runs the carriage which supports the helices for turning the malt.

72—73 indicate stationary marginal floor sections which extend longitudinally of the kiln compartment and are supported by brackets 85—86, respectively, as shown in Fig. 10. Said brackets also carry bearing-plates 87—88, the object of which will be hereinafter described. The entire floor of the kiln compartment is made up of the stationary marginal or side sections 72—73 and a greater or less number of perforated intermediate removable sections 74—75 76, as indicated in Fig. 7, all of which sections are on the same level so as not to interfere with the proper turning of the malt. The margins of the sections 74—76 which are adjacent to the marginal sections 72—73 are supported by the bearing-plates 87—88, respectively,—the inner margins of the floor sections 74—76 being supported by legs or standards 91—92, best shown in Fig. 10, said standards being secured, respectively, to the middle section 75 and the section 76, as illustrated in dotted lines in Fig. 10. The standards 92 also support one of the margins of the middle sections 75, and it will be understood that each of the sections 75—76 is provided with two legs or standards, one near each end, so that four legs, together with the bearing-plates 87—88, operate to support a transverse series of floor sections. The object of this arrangement is to provide for removing the floor of the kiln compartment in installments, so that the malt nearest one end of the kiln compartment may be removed and the floor of the compartment correspondingly reduced in area, so that the ventilation of the malt may be maintained notwithstanding the removal of a part thereof. Obviously, if the malt were removed from a portion of the floor without immediately distributing the remaining malt over the entire surface of the floor a part of the perforated floor would be exposed and consequently the air used for ventilation would pass through the exposed portion instead of through the malt, since the resistance at that point would be very much less than where the perforations were not exposed. The result would be that very little, if any, air would pass through the malt and consequently it would not be properly ventilated. By, however, removing a transverse series of floor sections as soon as the malt is removed therefrom and properly closing the end of the compartment below the floor, ventilation can be maintained through the remaining malt in the same way as before notwithstanding the removal of a greater or less quantity of the malt. As illustrated in dotted lines in Fig. 10, the floor sections are preferably not removed entirely from the compartment but are simply turned up on edge and supported by the bearing-plates 87—88, being turned back against the side walls of the compartment, as shown. In order to properly receive and retain the floor sections the bearing-plates 87—88 are provided with recesses 89—90, as shown in Fig. 11, which receive the edges of the floor sections in the manner shown in Fig. 10.

In order to close the end of the space below the floor of the kiln compartment, I provide a transverse partition 77 composed of two members hinged together intermediately, as shown at 68—69 in Fig. 10. The arrangement is such that the leaves or members of the partition may be moved into alinement so as to completely close the end of the space beneath the perforated floor of the kiln compartment, or may be folded back to permit the partition to be removed or put in place. The partition 77 is moved up from time to time as the floor sections are removed, so that the end of the space beneath the floor may be closed immediately upon removal of any transverse series of floor sections. In order to facilitate movement of the partition, it is provided with rollers 78, as shown in Figs. 8, 9 and 10.

In order that fresh attemperated air may be supplied from the attemperator room 52 to the withering kiln, I provide a passage 70 in the floor at one end of the kiln compartment which is covered by a grating 71, as shown in Fig. 1. A swinging valve 71ª is provided, which may be adjusted to control the operative area of the passage 70 and thereby regulate the quantity of the air admitted to the kiln.

As shown in Fig. 1, the space beneath the removable floor sections of the kiln compartment communicates through a passage 79 with an exhaust chamber 80, in which is provided a fan 81 for drawing air therefrom. Said exhaust chamber and fan are also shown in Fig. 12. 82 indicates a valve for the opening 79. 83 indicates an opening through which external or atmospheric air may be admitted to the kiln,—heaters 84 being provided so that the air may be warmed if desired. As indicated by the arrows in Figs. 1 and 2, the air passes in through the opening 83, thence down through the malt and out through opening 79 to the exhaust room 80, where it is discharged by means of the fan 81.

It will be understood that while I prefer to make the removable portion of the kiln floor in a series of three sections transversely arranged, the number of sections may be varied, any number being used, from one up, as preferred, so far as my invention generically considered is concerned.

In practice, as each section is removed a cart may be moved into the space between the stationary sections of the floor of the compartment, being moved up gradually as the different floor sections are withdrawn, so that the malt may be conveniently removed in installments, the operation of ventilating being continued without interruption.

I thus provide means whereby the germination or growth of the malt may be arrested and the malt maintained in green condition until used, and also for accomplishing this result, meanwhile permitting of the removal of the malt in installments without interference with the proper ventilation thereof. So far as I am aware I am the first in the art to accomplish these results, and the claims hereinafter made are to be construed accordingly.

That which I claim as my invention and desire to secure by Letters Patent is,—

1. A malt house having therein a kiln one or more germinating compartments, means for supplying fresh air to said germinating compartments and kiln, and means for delivering grain from said malting compartment or compartments to said kiln.

2. A malt house, comprising a plurality of malting compartments arranged one above another, a kiln, means for supplying fresh air to the upper melting compartment and kiln, means for admitting fresh air from said upper compartment to the lower compartment, and means for transporting grain from said malting compartments to said kiln.

3. In a malting apparatus, a compartment having a floor composed of one or more removable sections located above the permanent floor, thereby providing an air duct under said removable floor, and means for closing the end of the duct and causing air to circulate therethrough and through the grain in said compartment after one or more of said sections have been removed.

4. A malting apparatus, comprising a compartment having a floor composed of removable sections located above the permanent floor, thereby providing an air duct under said removable floor, and a movable partition adapted to be operated to close one end of the space beneath said removable floor after one or more sections thereof have been removed.

5. A malting apparatus, comprising a compartment having a perforated floor composed of removable sections located above the permanent floor, thereby providing an air duct under said removable floor, and means for closing said duct at one end when the section or sections adjacent thereto are removed.

6. A malt-house having one or more germinating compartments, a withering kiln above said germinating compartments, an attemperator between said withering kiln and said germinating compartments, and means for supplying air from said attemperator to said germinating compartments and kiln.

7. A malting apparatus, comprising a compartment having a perforated floor provided with one or more removable sections located above the permanent floor, thereby providing an air duct under said perforated floor, and means for closing the end of the duct and causing air to circulate through the grain in said compartment after one of said sections has been removed.

8. A malt house having one or more germinating compartments, a withering kiln, said kiln having perforated removable floor sections located above the permanent floor, thereby forming an air duct under said perforated floor, means for supplying fresh air to said germinating compartments and to said kiln, and means for maintaining ventilation of the malt in said kiln after certain floor sections have been removed.

9. A malting apparatus, comprising a compartment provided with a floor having removable sections located above the permanent floor, thereby providing an air duct under said removable floor, and a folding partition adapted to be operated to close one end of the space beneath said removable floor after one or more sections thereof have been removed.

10. A malting apparatus, comprising a compartment provided with a floor having removable sections located above the permanent floor, thereby providing an air duct under said removable floor, a folding partition adapted to be operated to close one end of the space beneath said removable floor after one or more sections thereof have been removed, and rollers on which said partition is adapted to run.

11. In a malting apparatus, a compartment having a perforated floor located above the permanent floor, thereby providing a channel under said perforated floor, a partition for varying the operative area of said channel, and means for ventilating the malt in said compartment.

12. A malt house having one or more germinating compartments, a withering compartment having a perforated floor located above the permanent floor, thereby providing a channel under said perforated floor, a partition for varying the operative area of said channel, and means for ventilating the malt in said withering and germinating compartments.

13. In a malting apparatus, a compartment having a perforated floor provided with one or more removable sections, said perforated floor being located above the permanent floor, thereby providing an air duct under said perforated floor, and means for closing the end of the duct and causing air to circulate therethrough and through the perforated floor after one or more of said sections have been removed.

WILLIAM H. PRINZ.

Witnesses:
MINNIE C. HUNTER,
JOHN L. JACKSON.